United States Patent
Planque et al.

(10) Patent No.: US 11,063,268 B2
(45) Date of Patent: Jul. 13, 2021

(54) REVERSIBLE INDIVIDUAL UNIT FOR ELECTROLYSIS OR CO-ELECTROLYSIS OF WATER (SOEC) OR FOR FUEL CELL (SOFC) WITH OPERATION UNDER PRESSURE AND DECOUPLED COMPRESSIVE FORCE

(71) Applicant: COMMISSARIAT A L'ENERGIE ATOMIQUE ET AUX ENERGIES ALTERNATIVES, Paris (FR)

(72) Inventors: Michel Planque, Seyssins (FR); Charlotte Bernard, Contamine sur Arve (FR); Guilhem Roux, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/171,598

(22) Filed: Oct. 26, 2018

(65) Prior Publication Data

US 2019/0131634 A1    May 2, 2019

(30) Foreign Application Priority Data

Oct. 30, 2017 (FR) ...................................... 1760204

(51) Int. Cl.
*H01M 8/0258* (2016.01)
*H01M 8/0438* (2016.01)
(Continued)

(52) U.S. Cl.
CPC ............. *H01M 8/0258* (2013.01); *C25B 1/00* (2013.01); *C25B 1/04* (2013.01); *C25B 9/05* (2021.01); *C25B 9/19* (2021.01); *C25B 9/73* (2021.01); *C25B 9/77* (2021.01); *C25B 13/04* (2013.01); *C25B 15/02* (2013.01); *C25B 15/08* (2013.01); *H01M 8/0276* (2013.01);
(Continued)

(58) Field of Classification Search
CPC .. C25B 1/02–12; C25B 9/206; H01M 9/0276; H01M 8/04746–04783
See application file for complete search history.

(56) References Cited

U.S. PATENT DOCUMENTS 6,689,499 B2    2/2004    Gillett et al.
8,945,356 B2    2/2015    Le Gallo et al.
(Continued)

FOREIGN PATENT DOCUMENTS

FR    2 957 361 A1    9/2011
FR    3 000 108 A1    6/2014
(Continued)

OTHER PUBLICATIONS

French Preliminary Search Report from Corresponding French Application No. FR1760204 dated Apr. 19, 2018.
(Continued)

*Primary Examiner* — Ciel P Contreras
(74) *Attorney, Agent, or Firm* — Pearne & Gordon LLP

(57) ABSTRACT

The application relates to a novel module for electrolysis or co-electrolysis of water or of SOFC fuel cell, within which the forces necessary to compress the seals are decoupled from those necessary for the electrical contact elements that ensure the passage of current in the module.

16 Claims, 6 Drawing Sheets

Figure 7:
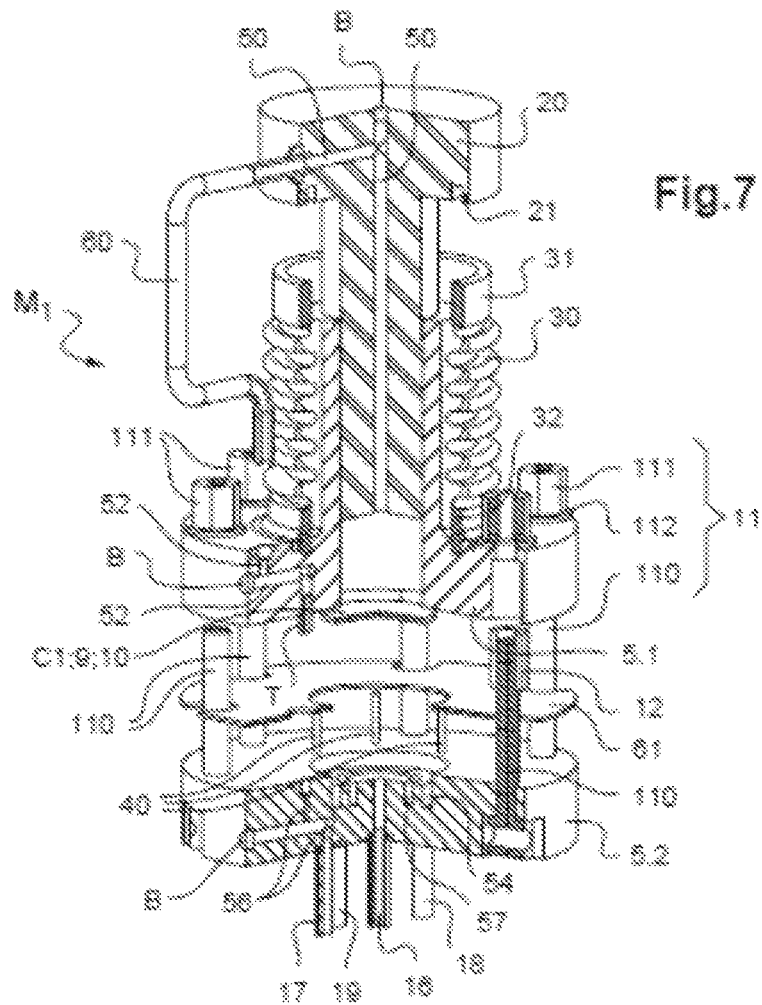

(51) Int. Cl.

| | |
|---|---|
| H01M 8/04694 | (2016.01) |
| C25B 15/02 | (2021.01) |
| H01M 8/0282 | (2016.01) |
| C25B 13/04 | (2021.01) |
| H01M 8/12 | (2016.01) |
| C25B 1/00 | (2021.01) |
| H01M 8/04089 | (2016.01) |
| H01M 8/0276 | (2016.01) |
| H01M 8/04119 | (2016.01) |
| H01M 8/04492 | (2016.01) |
| H01M 8/04746 | (2016.01) |
| H01M 8/2425 | (2016.01) |
| C25B 15/08 | (2006.01) |
| C25B 1/04 | (2021.01) |
| C25B 9/05 | (2021.01) |
| C25B 9/19 | (2021.01) |
| C25B 9/73 | (2021.01) |
| C25B 9/77 | (2021.01) |
| H01M 8/124 | (2016.01) |

(52) U.S. Cl.
CPC ......... *H01M 8/0282* (2013.01); *H01M 8/045* (2013.01); *H01M 8/0441* (2013.01); *H01M 8/04104* (2013.01); *H01M 8/04149* (2013.01); *H01M 8/04388* (2013.01); *H01M 8/04694* (2013.01); *H01M 8/04753* (2013.01); *H01M 8/12* (2013.01); *H01M 8/2425* (2013.01); *H01M 2008/1293* (2013.01)

(56) References Cited

U.S. PATENT DOCUMENTS

| | | | |
|---|---|---|---|
| 9,917,311 B2 | 3/2018 | Planque et al. | |
| 2002/0081471 A1 | 6/2002 | Keegan et al. | |
| 2012/0280179 A1* | 11/2012 | Marsh | F17C 11/00 |
| | | | 252/372 |
| 2015/0001067 A1* | 1/2015 | Mantai | C25B 15/02 |
| | | | 204/252 |
| 2017/0362724 A1 | 12/2017 | Planque et al. | |
| 2018/0287172 A1 | 10/2018 | Chatroux et al. | |

FOREIGN PATENT DOCUMENTS

| | | | | |
|---|---|---|---|---|
| FR | 3030893 A1 * | 6/2016 | ............ | H01M 8/006 |
| FR | 3 042 069 A1 | 4/2017 | | |
| WO | 2016/096752 A1 | 6/2016 | | |

OTHER PUBLICATIONS

Seidler et al., "Presssurized solid oxide fuel cells: Experimental studies and modeling"; Journal of Power Sources, vol. 196, No. 17, Oct. 7, 2010; pp. 7195-7202; XP055260130.

* cited by examiner

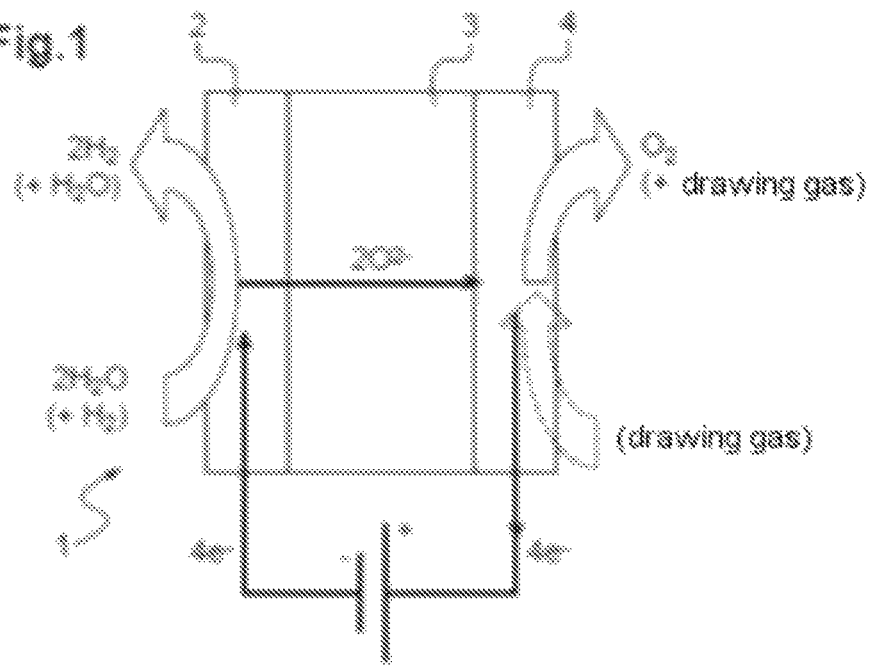
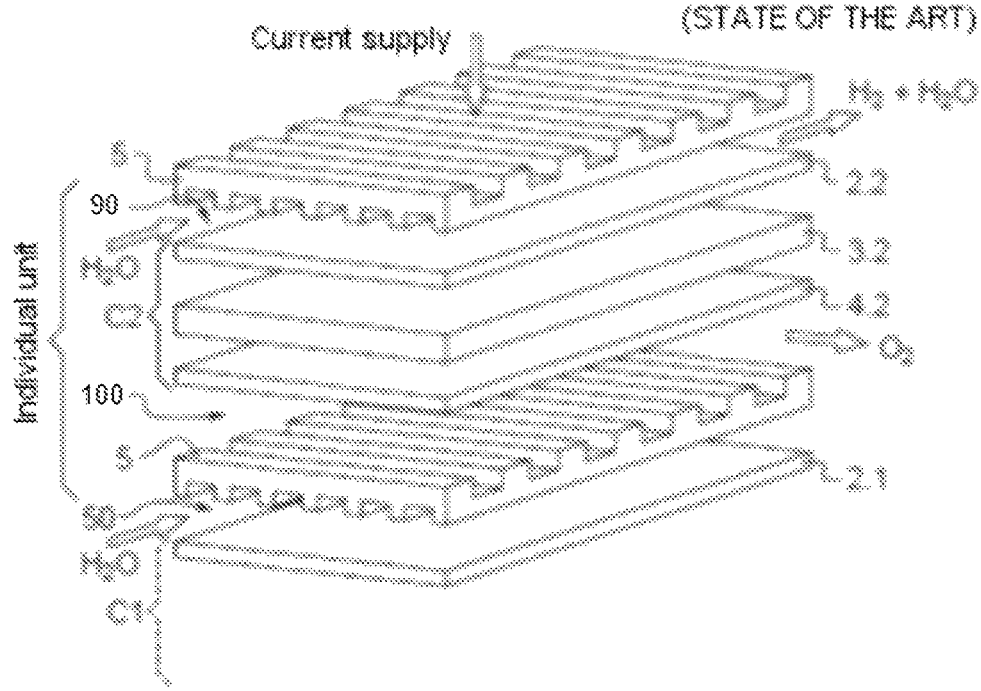

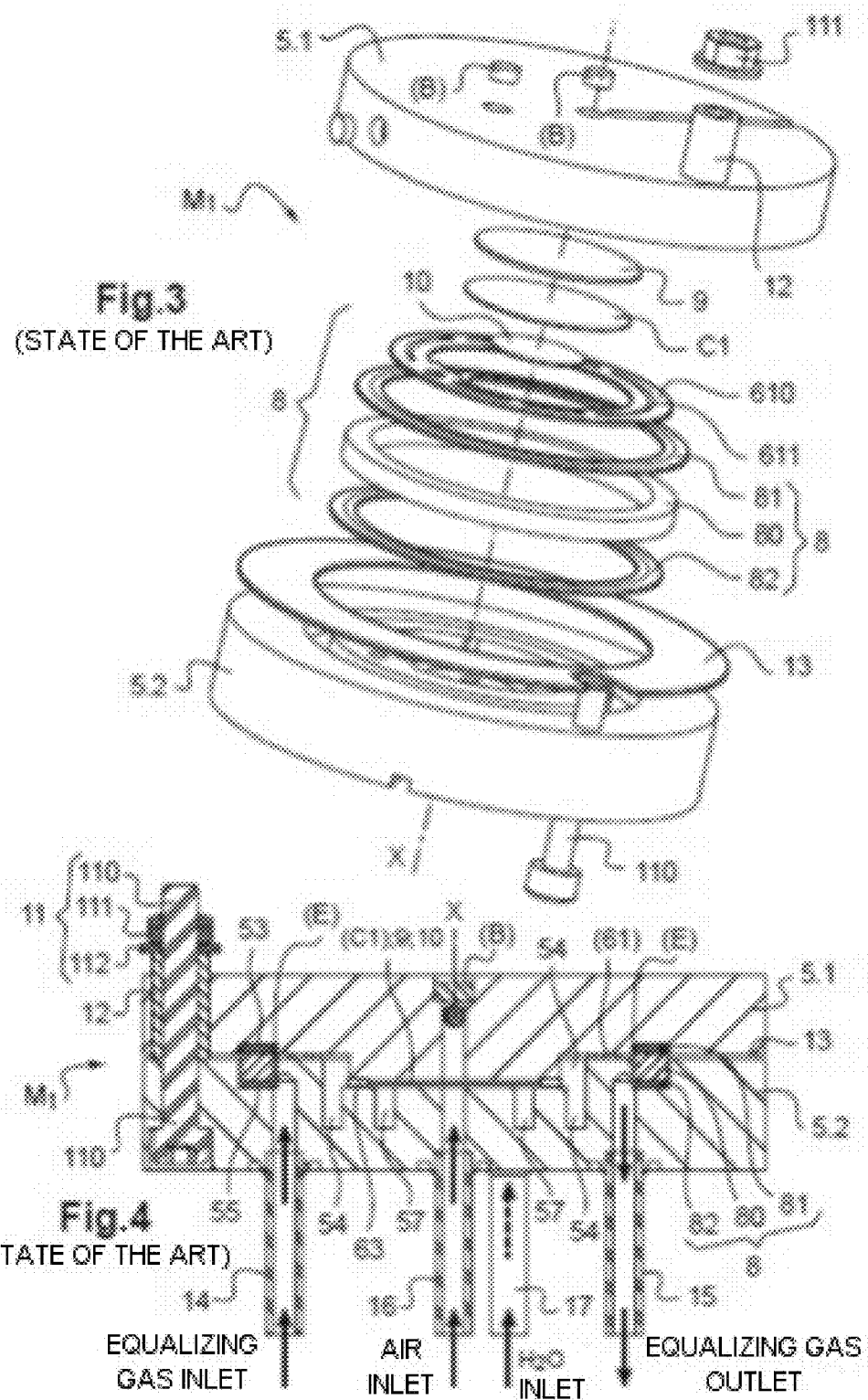

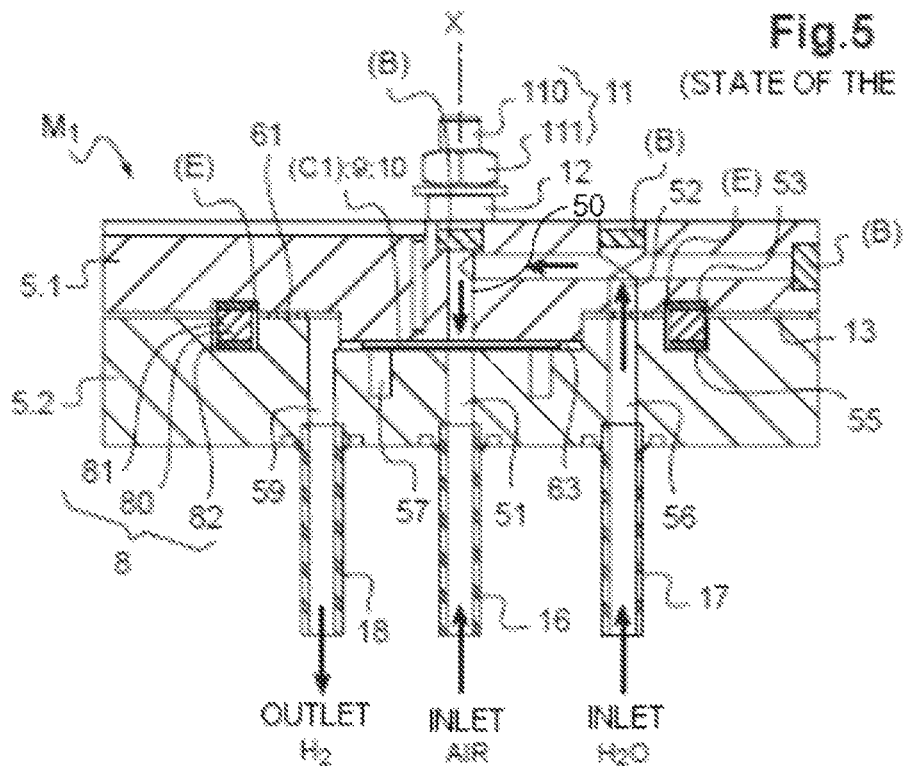
Fig.5 (STATE OF THE ART)
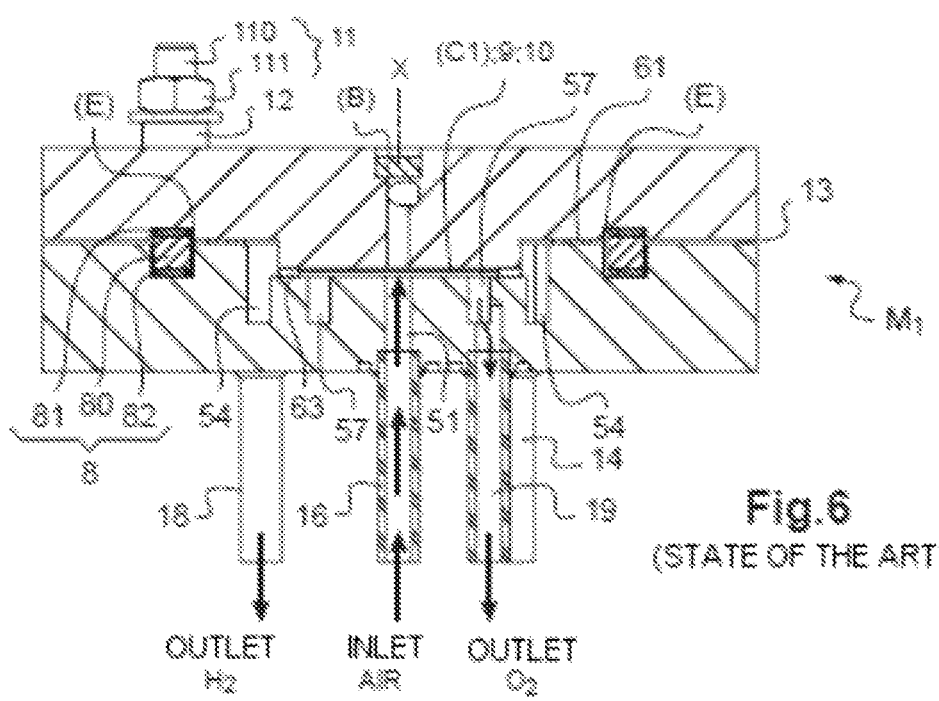
Fig.6 (STATE OF THE ART)

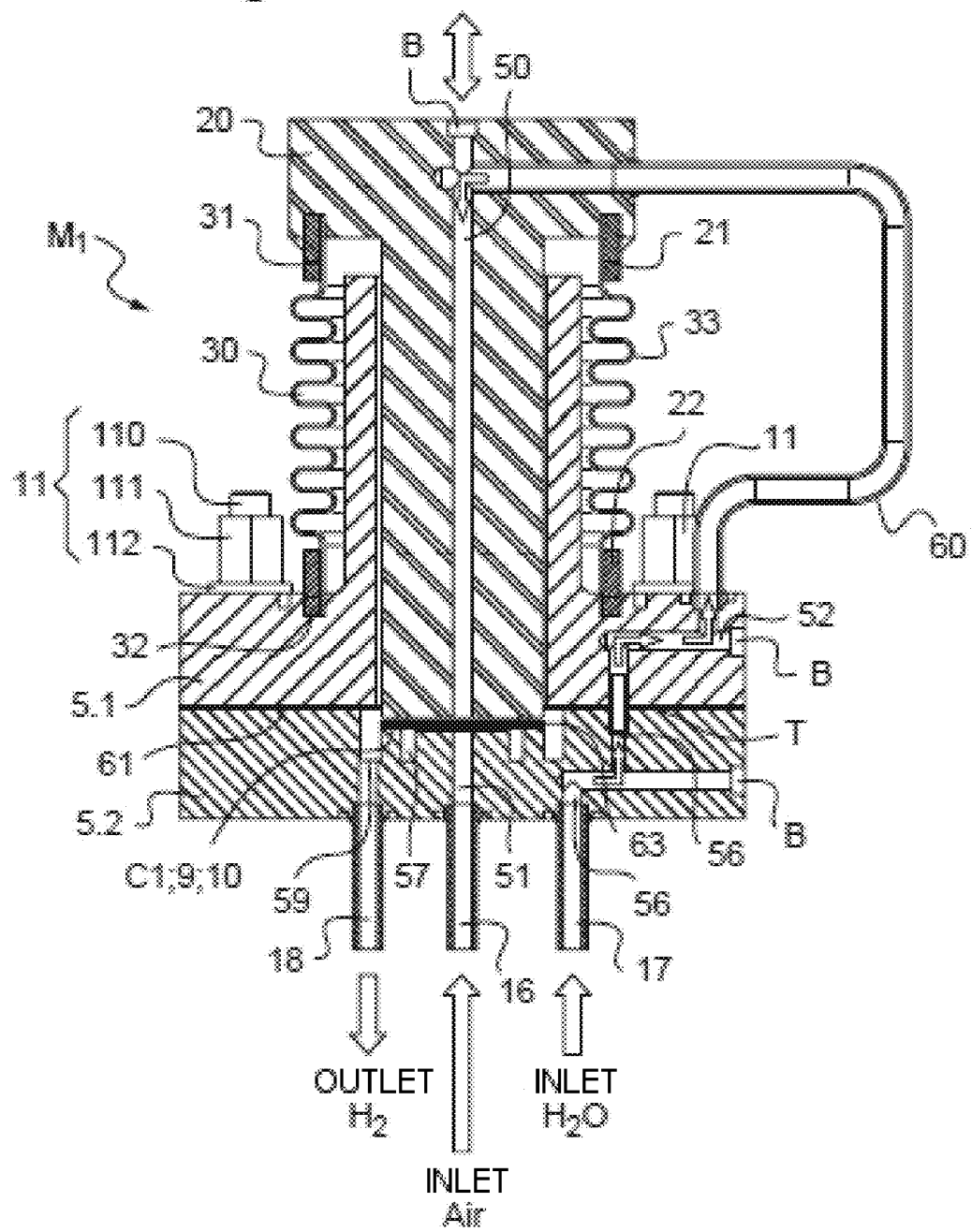

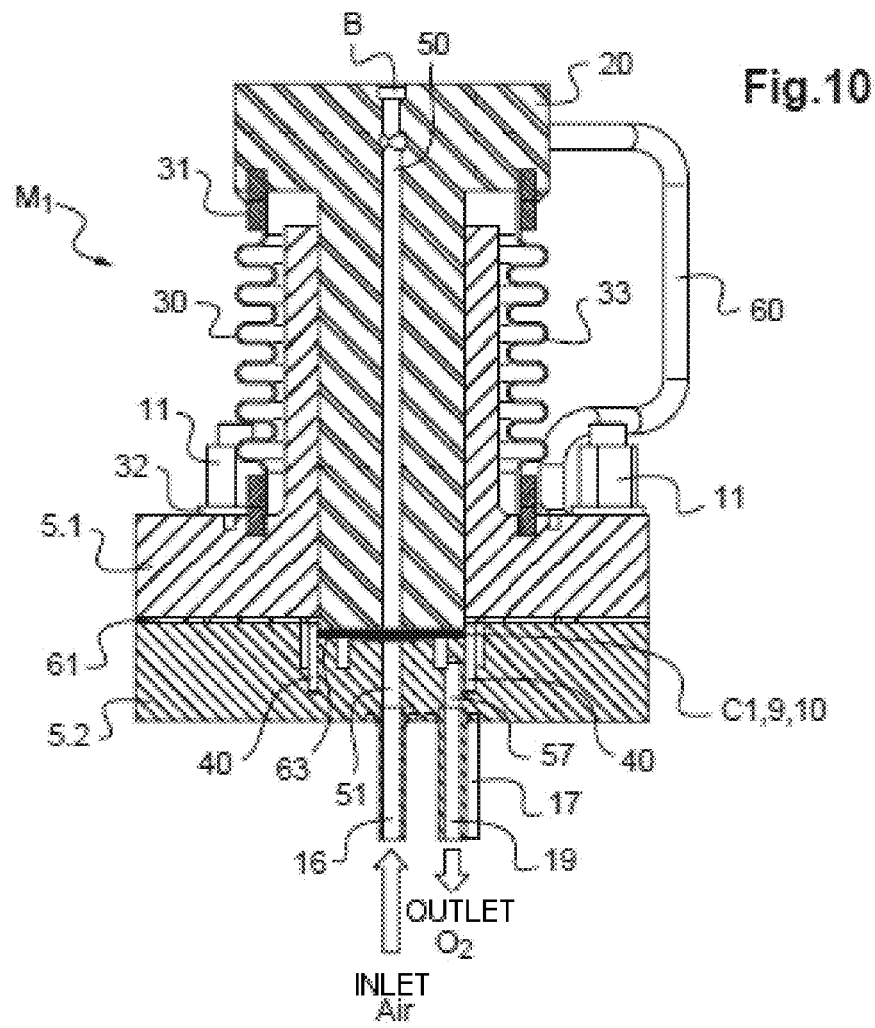
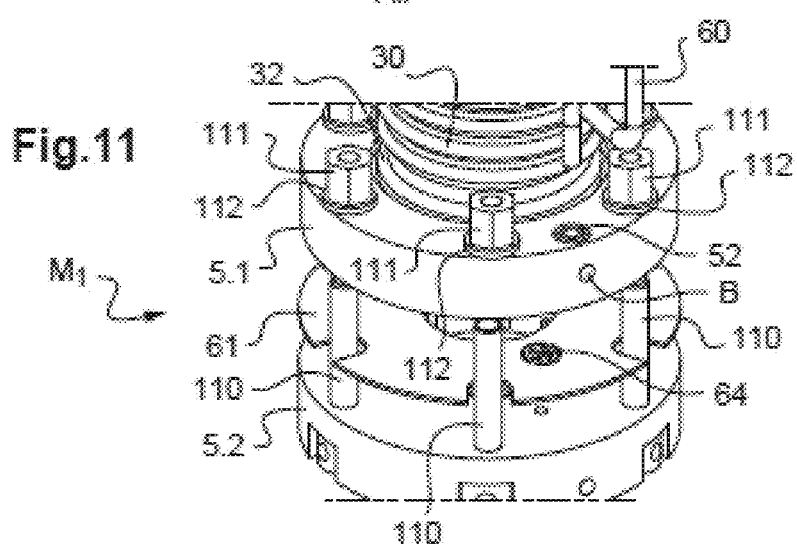

REVERSIBLE INDIVIDUAL UNIT FOR ELECTROLYSIS OR CO-ELECTROLYSIS OF WATER (SOEC) OR FOR FUEL CELL (SOFC) WITH OPERATION UNDER PRESSURE AND DECOUPLED COMPRESSIVE FORCE

The present application claims priority to and incorporates by reference the entire contents of French Patent Application No. 1760204 filed in France on Oct. 30, 2017.

TECHNICAL FIELD

The present invention relates to the field of solid-oxide fuel-cells (SOFC) and to the field of high-temperature electrolysis (HTE) of water (or HTSE, acronym for high-temperature steam electrolysis) in solid-oxide electrolysis cells (SOECs), and that of high-temperature co-electrolysis of water and of another gas chosen from carbon dioxide $CO_2$ or nitrogen dioxide $NO_2$.

The invention relates more particularly to the production of a novel module that integrates electrical and fluid interconnectors for distributing electrical current and gases within a reactor for high-temperature electrolysis or co-electrolysis of water (HTE) of SOEC type, for producing hydrogen $H_2$ from steam $H_2O$, or of a fuel cell of SOFC type, and an individual electrochemical cell.

The module according to the invention enables operation under pressure.

Although it is described mainly with reference to an application in high-temperature electrolysis of water, the invention applies equally well to co-electrolysis of water and of another gas chosen from carbon dioxide $CO_2$ or nitrogen dioxide $NO_2$, and to an SOFC fuel cell.

The invention is applied to an SOFC fuel cell using either hydrogen or hydrocarbons, for example methane $CH_4$, as fuel.

PRIOR ART

The electrolysis of water is an electrolytic reaction that decomposes water into gaseous dioxygen and dihydrogen by means of an electrical current according to the reaction:

$$H_2O \rightarrow H_2 + \tfrac{1}{2}O_2.$$

It is advantageous to carry out the electrolysis of water at high temperature, typically between 600 and 950° C., as some of the energy required for the reaction may be supplied by heat, which is less expensive than electricity, and activation of the reaction is more efficient at high temperature and does not require a catalyst. It is known to use an electrolyzer of the SOEC type (acronym for "solid-oxide electrolysis cell") to implement high-temperature electrolysis, said electrolyzer consisting of a stack of individual units that each comprise a solid-oxide electrolysis cell consisting of three layers (anode/electrolyte/cathode) that are superposed on one another, and of interconnection plates made of metal alloys, are also referred to as bipolar plates or interconnectors. The function of the interconnectors is both to let electrical current pass and gases flow to each cell (injected steam and extracted hydrogen and oxygen in an HTE electrolyzer; injected air and hydrogen and extracted water in an SOFC cell) and to separate the anode and cathode compartments, which are the gas-flow compartments on the anode side and the cathode side of the cells, respectively. To carry out high-temperature electrolysis (HTE) of steam, steam ($H_2O$) is injected into the cathode compartment. Under the action of the current applied to the cell, dissociation of water molecules in steam form takes place at the interface between the hydrogen electrode (cathode) and the electrolyte: this dissociation produces dihydrogen gas ($H_2$) and oxygen ions. The dihydrogen is collected and discharged at the outlet of the hydrogen compartment. The oxygen ions ($O^{2-}$) migrate through the electrolyte and recombine into dioxygen at the interface between the electrolyte and the oxygen electrode (anode).

As shown schematically in FIG. 1, each individual electrolysis cell 1 is formed from a cathode 2 and an anode 4, placed on either side of a solid electrolyte 3, generally in the form of a membrane. The two electrodes (cathode and anode) 2, 4 are electrical conductors, made of porous material, and the electrolyte 3 is gastight, an electron insulator and an ion conductor. The electrolyte may in particular be an anion conductor, more precisely an anion conductor of the $O^{2-}$ ions, and the electrolyzer is then referred to as an anion electrolyzer.

The electrochemical reactions take place at the interface between each of the electron conductors and the ion conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3 inserted between the two electrodes 2, 4 is the site of migration of the $O^{2-}$ ions under the effect of the electrical field created by the difference in potential imposed between the anode 4 and the cathode 2.

As illustrated in brackets in FIG. 1, the steam at the cathode inlet may be accompanied by hydrogen $H_2$ and the hydrogen produced and recovered at the outlet may be accompanied by steam. Likewise, as illustrated in dotted lines, a draining gas such as air may additionally be injected at the inlet in order to remove the oxygen produced. The injection of a draining gas has the additional role of acting as thermal regulator.

An individual electrolysis reactor consists of an individual cell as described above, with a cathode 2, an electrolyte 3 and an anode 4, and of two monopolar connectors which provide the electrical, hydraulic and thermal distribution functions.

In order to increase the flow rates of hydrogen and oxygen produced, it is known to stack several individual electrolysis cells on top of one another, separating them with interconnection devices, usually known as bipolar interconnection plates or interconnectors. The assembly is positioned between two end interconnection plates which bear the electrical supplies and gas supplies of the electrolyzer (electrolysis reactor).

A high-temperature water electrolyzer (HTE) thus comprises at least one, generally a plurality of, electrolysis cells stacked on top of one another, each individual cell being formed of an electrolyte, of a cathode and of an anode, the electrolyte being inserted between the anode and the cathode.

The fluidic and electrical interconnection devices, which are in electrical contact with one or more electrodes, generally provide the functions of introducing and collecting electrical current and delimit one or more compartments for the circulation of the gases.

Thus, a "cathode" compartment has the role of distributing the electrical current and steam and also of recovering the hydrogen at the cathode in contact.

An "anode" compartment has the role of distributing the electrical current and also of recovering the oxygen produced at the anode in contact, optionally with the help of a draining gas.

FIG. 2 represents an exploded view of individual units of a high-temperature steam electrolyzer according to the state of the art. This HTE electrolyzer comprises a plurality of individual electrolysis cells C1, C2, . . . , of solid oxide (SOEC) type, stacked alternately with interconnectors 5. Each cell C1, C2, . . . consists of a cathode 2.1, 2.2, . . . and an anode 4.1, 4.2, . . . between which an electrolyte 3.1, 3.2, . . . is arranged. The assembly of the electrolysis cells is supplied in series by the electrical current and in parallel by the gases.

The interconnector 5 is a component made of metal alloy, which provides the separation between the cathode compartment 90 and anode compartment 100, which are defined by the volumes between the interconnector 5 and the adjacent cathode 2.1 and between the interconnector 5 and the adjacent anode 4.2, respectively. It also provides distribution of the gases to the cells. Injection of steam into each individual unit takes place in the cathode compartment 90. Collection of the hydrogen produced and of the residual steam at the cathode 2.1, 2.2, . . . takes place in the cathode compartment 90 downstream of the cell C1, C2, . . . after dissociation of the steam by the latter. Collection of the oxygen produced at the anode 4.2 takes place in the anode compartment 100 downstream of the cell C1, C2, . . . after dissociation of the steam to give oxygen ions by the latter.

The interconnector 5 provides the passage of the current between the cells C1 and C2 by direct contact with the adjacent electrodes, that is to say between the anode 4.2 and the cathode 2.1.

In a solid oxide fuel cell SOFC according to the state of the art, the cells C1, C2, . . . , and interconnectors 5 used are the same components, but the operation is the reverse of that of an HTE electrolyzer such as has just been explained, with a reversed current direction, with air which supplies the cathode compartments and hydrogen as fuel which supplies the anode compartments.

Satisfactory operation of an HTE electrolyzer requires, inter alia, the following essential functions:

A/ good electrical insulation between two adjacent interconnectors in the stack, otherwise the individual electrolysis cell inserted between the two interconnectors will be short-circuited, B/ good leak tightness between the two separate compartments, i.e. the anode compartment and the cathode compartment, to prevent the recombination of the gases produced which would lead to a decreased yield and above all the appearance of hot points that damage the electrolyzer; this corresponds to seeking an open cell voltage (OCV);

C/ good distribution of the gases both at the inlet and on recovery of the gases produced, otherwise there will be a loss of yield, nonuniformity of pressure and nonuniformity of temperature within the different individual cells, or even unacceptable deterioration of the cells; this corresponds to seeking the lowest polarization resistance;

D/ good electrical contact and sufficient contact surface area between each cell and interconnector, in order to obtain the lowest ohmic resistance between cells and interconnectors.

The high temperatures considerably complicate the fulfilment of the three abovementioned essential functions A/ to C/. In addition, the fragility of the solid oxide cells necessitates certain restrictive design measures so as to guarantee the mechanical integrity thereof.

Different designs already exist for simultaneously fulfilling the four essential functions A/ to D/, but there remain various difficulties to overcome.

In particular, regarding fulfilling the function B/, given the high operating temperature ranges of HTE electrolyzers and SOFC fuel cells, typically 600° C. to 1000° C., the seals are conventionally produced based on glass or glass-ceramic. A glass seal is in the pasty state at the operating temperature.

At the design stage, it is necessary to take care not to expel the glass under the effect of a pressure difference applied to the seal. A glass-ceramic seal undergoes a thermal cycle in situ with the aim of causing it to crystallize and hence of making it solid at the operating temperature. As with the glass seal, it is necessary to take care not to expel the glass-ceramic before it is solid.

The simplest configuration consists in placing the glass between two dense planar elements, in opposition to the different porous materials present in an SOEC reactor or an SOFC fuel cell: the surface tension makes it possible to avoid the flowing thereof up to a certain pressure differential on either side of the seal.

In order to promote this stability, it is necessary to reduce the height of the seal as far as possible, to increase the surface area of the zones in contact with the glass and to reduce the pressure differential to which the seal is subjected.

Producing this type of leak-tight seal based on glass within SOEC reactors or SOFC cells meets with numerous problems. Firstly, the electrodes on either side of the cell are porous and they cannot therefore simply support glass-based seals. Moreover, electrical insulation between adjacent interconnectors has to be guaranteed, and this cannot be ensured without risk by too thin a film of glass. Finally, these glasses must be compressed to reduce their height, but also to guarantee electrical contact between cell and interconnectors. This clamping must be carried out while avoiding any overhang of the cell in order to preserve its mechanical integrity.

In the configuration disclosed in patent application FR3000108, some of these restrictions are taken into account by the density of the non-porous surfaces on either side of a seal: an individual cell is kept flat on its support (cathode in HTE or SOFC anode) and clamped between two adjacent interconnectors; a first and second seal of glass or glass-ceramic type, separated by an electrical insulator in order to avoid completing the circuit, are arranged between interconnectors to make it possible to provide the leak tightness of the hydrogen produced (fuel supplied in SOFC) and finally a third seal of the same type is arranged on the anode side (cathode in SOFC) between the electrolyte and the interconnector, making it possible to provide the leak tightness of the oxygen produced (or air supplied in SOFC). Thus, in the configuration disclosed, each seal rests on an intrinsically leak tight, hence non-porous, support. Moreover, high surface tension between the seals and their support makes it possible to prevent the glass from flowing up to a certain pressure differential on either side of a seal. In order to promote obtaining good mechanical strength of the seal, it is necessary to reduce the height of the seal as much as possible and to increase the surface area of the zones in contact with the glass.

The height of the glass or glass-ceramic seals is reduced, as explained above, by clamping. Clamping is also required in order to reduce the impact of the contact resistances in the stack, that is to say in order to ensure the abovementioned function D/, i.e. good electrical contact between cell and interconnectors. However, an electrolysis cell is mounted overhanging, due to its seal. Thus, the clamping required to reduce the height of the seals and ensure the function D/of good electrical contact between cell and interconnectors must also be carried out without potentially damaging bending of the cell which could lead to breakage thereof.

Thus, the configurations with seals based on glass or on glass-ceramic, such as that of the application FR3000108, have undeniable advantages of electrical insulation and accommodation of the deformations between parts of an HTE or SOFC stack.

Despite this, as already mentioned, seals based on glass or on glass-ceramic have the intrinsic major drawback of only withstanding small differences in pressure, of the order of a few hundred millibars.

The internal operation of an SOFC cell or of an HTE reactor under pressure, typically a few bars to a few tens of bars, typically 30 bar, thus requires a solution to prevent the loss of the leak tightness by the seals.

A solution that consists in placing the HTE reactor stack or SOFC cell in a leak-tight enclosure that itself is pressurized is already known. Mention will be made here of patents or patent applications FR 2957361A1, US2002/0081471 and U.S. Pat. No. 6,689,499 B2, which disclose this type of solution. This known solution has the advantage of making it possible to apply the same pressure inside and outside the stack. This therefore allows operation at a high pressure, of a few bars to a few tens of bars, without mechanically stressing the glass or glass-ceramic seals.

However, this requires guaranteeing the mechanical strength of a chamber pressurized to these pressures, typically 30 bar, and which contains a stack at a high temperature, typically at 800° C. with hydrogen $H_2$ and oxygen $O_2$ circulating within it. Managing the safety of this pressurized chamber may be a not insignificant task.

Moreover, the presence of the chamber complicates keeping the stack clamped, which makes it possible to guarantee good electrical contact between interconnectors and cells. In particular, moving the clamping elements into a relatively cold zone is not easy.

Finally, the pressurized chamber must be produced with passages that both pass through and are leak tight, in order to carry out the supply/recovery of gas and of electrical current from/to the outside of the chamber. Thus, some of these passages must be electrically insulating, and those containing steam must be at a controlled temperature in order to avoid any bursts of steam. Indeed, if the temperature is not controlled in the inlet and/or outlet pipes, the steam continuously circulating inside may encounter a cold zone, and then become condensed in an uncontrolled manner. This causes bursts which generate variations in gas and pressure supply.

All these precautionary measures lead to a complete installation, that integrates the pressurized leak-tight chamber and the HTE reactor or the SOFC cell, which is complicated and expensive.

The applicant thus proposed, in application WO2016/096752, a solution which enables operation under pressure while dispensing with a pressurized leak-tight chamber housing an HTE reactor (electrolyzer) or an SOFC cell.

This solution consists in producing an individual module with a circuit for circulating a gas that is additional to the reagent gases required for the electrolysis reaction or for the reverse reaction in an SOFC cell, the circuit being suitable so that, during operation under pressure, this additional gas equalizes, on one side of the seals based on glass and/or on glass-ceramic, the pressure of the reagent gases generated on the other side.

The description of an embodiment of an individual module M1 according to application WO2016/096752 is reproduced in more detail here in relation to FIGS. 3 to 6.

First of all, it is specified that the stoppers (B) shown on these figures serve to seal, by welding, the holes made in the interconnector components in order to delimit the gas supply and recovery conduits. However, once the interconnectors are finished, they have no function in the operation of an HTE reactor.

Module M1 comprises an individual electrochemical cell (C1) of axisymmetrical form about a central axis X, the cell being formed of a cathode, an anode and an electrolyte inserted between the cathode and the anode and two electric and fluid interconnectors 5.1, 5.2 on either side of the cell.

The two interconnectors 5.1, 5.2 are each produced from a single metal part, preferably made of ferritic steel containing approximately 20% chromium, preferably made of CROFER® 22APU or F18TNb, or based on nickel of Inconel® 600 or Haynes® type.

The upper interconnector 5.1 is pierced with a conduit 50 for supplying steam, which opens out along the central axis on the cell on the cathode side. As explained below, radial distribution is provided of the steam supplied and of the hydrogen produced to a conduit 59 for recovering the hydrogen produced, opening out parallel to the central axis at the periphery of the cell on the cathode side.

The lower interconnector 5.2 is pierced with a conduit 51 for supplying draining gas such as air, which opens out along the central axis on the cell on the anode side. As explained below, radial distribution is provided of the air supplied and of the oxygen produced to a conduit 54 for recovering the oxygen produced, opening out parallel to the central axis at the periphery of the cell on the anode side.

A first seal 61 of axisymmetrical form about the central axis X is arranged at the periphery of the individual cell C1 and bearing simultaneously against each of the two interconnectors. This seal is provided to ensure leak tightness around the cathode compartment.

A second seal 63 of axisymmetrical form about the central axis is arranged at the periphery of the anode of the individual cell and bearing simultaneously against the lower interconnector and against the electrolyte. This seal is provided to ensure leak tightness around the anode compartment. The seals 61 and 63 are based on glass and/or glass-ceramic.

A device for electrical insulation and sealing 8, of axisymmetrical form about the central axis X, is arranged at the periphery of the first seal, around the cathode compartment.

The device 8 consists of an electrically insulating washer 80 forming a wedge, clamped by the third and fourth metal seals 81, 82, without them being in contact with one another. Each of these third and fourth seals 81, 82 is metallic and bears respectively against the upper and lower interconnector.

The lower interconnector 5.2 is pierced with at least one conduit 58 for supplying a gas, referred to as equalizing gas, and at least one conduit 58 for recovering this equalizing gas, which opens out on the annular space E delimited between the seal 61 and the device 8 so as to carry out annular distribution of the equalizing gas, in order to equalize the pressures on either side of the first seal 61 during operation.

The device 8 is suitable for withstanding a large pressure differential between the pressure of the equalizing gas, which is brought to a value as close as possible to the operating pressure of the HTE reactor, typically from 10 to 30 bar and the pressure outside the module, typically 1 bar.

The insulating washer 80 makes it possible to avoid any short-circuit between the lower interconnector 5.2 and the upper interconnector 5.1. Finally, the metal seals are suitable for having expansions that are compatible with the materials of the interconnectors, especially the interconnectors based on stainless ferritic steel.

The insulating washer or wedge 80 may be made of zirconia and the two metal seals 81, 82 based on alloy comprising chromium and iron, for example made of Fecralloy®.

The upper interconnector 5.1 is pierced with a lateral supply conduit 52 that opens out in the central supply conduit 50, as can be seen in figures. The upper interconnector also comprises an annular groove 53 for accommodating the upper metal seal 81 and the insulating wedge 80.

The lower interconnector 5.2 comprises a bearing area on which both the second seal 63 and the individual cell are positioned. From the immediate periphery of the cell to the outside, the lower interconnector 5.2 comprises an annular groove 54 for the radial flow of the $H_2O/H_2$ mixture, a planar surface and another annular groove 55 concentric to that around the cell, in order to receive the sealing device 8. The planar surface is pierced with a lateral supply conduit intended to be in communication with the central supply conduit 51 of the upper interconnector 5.1.

The planar surface of the lower interconnector 5.2 serves as support at the seal 61 and around the lateral supply conduit 56. It can be seen that the seal 61 preferably comprises a washer or ring made of mica 610 having slots 611 in which a glass or glass-ceramic bead is produced. During clamping, this glass or glass-ceramic bead flows into the slots 611 and thereby creates a connection with good adhesion between the two interconnectors 5.1 and 5.2, which connection is also laterally wedged in place by the mica ring 610.

The lower interconnector 5.2 is pierced with an annular groove 55 that opens out in the conduits for supplying 58 and recovering 58 the equalizing gas.

Each of the conduits for supplying 58 and recovering 58 the equalizing gas opens out in the groove 55 for housing the sealing device 8. A lateral clearance for mounting the sealing device 8 in the grooves 53, 55, respectively of the upper 5.1 and lower 5.2 interconnector is provided, the clearance being sufficient to allow the equalizing gas to pass into the annular space (E) thus defined between device 8 and the interior of the grooves 53, 55. The passage made in the bottom of the piercing of the supply conduit 58 inside the sealing device 8, which enables the equalizing gas to reach the annular space (E) and thereby ensures the annular distribution thereof. This annular distribution of the equalizing gas forms a sort of peripheral curtain of gas around the reagent gas compartments, which makes it possible to equalize the pressures.

By virtue of the presence of the grooves 54, 57 for distributing reagent gases on the lower interconnector 5.2, the module according to the invention with the two interconnectors and the cell with axisymmetrical geometry about the axis X enables homogeneous radial supply of the cell with reagent gases, regardless of the pressure level.

The module M1 according to the invention also comprises electrical contact grids 9, 10 on either side of the cell C1. These electrical contact elements which may especially have the effect of compensating flatness defects in order to obtain better electrical contact between the upper interconnector and the cathode on the one hand and between the lower interconnector and the anode on the other.

The module M1 may comprise, at the periphery of the insulation and sealing device 8, an electrically insulating ring 13, of the type made of mica, the ring 13 bearing on all the zones in which the two peripheral surfaces of the interconnectors 5.1 and 5.2 are facing one another.

The module M1 incorporates a bolt 11 mounted passing through the housings made in the interconnectors 5.1, 5.2. The head 110 of the through bolt 11 rests in a housing of an end interconnector 5.2 or 5.3 and a nut 111 screwed on the through bolt projects on the other end interconnector 5.1, the nut 111 bearing indirectly by means of a washer 112 on an electrical insulating sleeve 12 mounted in the housing of the upper interconnector 5.2 or 5.1.

The bolt 11 constitutes a device which prevents inopportune opening of the module during operation under pressure, which ensures safe operation, but not clamping by compression of the cell between the interconnectors. Clamping, which guarantees leak tightness and electrical contact, is achieved by applying a well-suited compressive force of one interconnector on the other.

Finally, several pipes are connected to the different conduits for supplying and recovering the gases produced in the interconnectors in the following way:
- a lateral pipe 14 for supplying the equalizing gas is connected to the lateral supply conduit 58 of the lower interconnector 5.2 or 5.3, while a pipe 15 for recovering the equalizing gas is connected to the lateral recovery conduit 58 of the lower interconnector;
- a central pipe 16 for supplying air is connected to the central supply conduit of the lower interconnector 5.2 or 5.3, while a pipe 19 for recovering the oxygen produced is connected to the annular groove 57 of the lower interconnector 5.2 or 5.3;
- a central pipe 17 for supplying steam is connected to the lateral supply conduit of the lower interconnector 5.2 or 5.3, itself opening onto that of the upper interconnector 5.1, while a pipe 18 for recovering the hydrogen produced is connected to the lateral recovery conduit 59 of the lower interconnector.

The operation of an HTE electrolysis reactor according to application WO2016/096752 comprising several modules M1 which have just been described, the modules being stacked on one another, is as follows.

Steam is supplied to the pipe 17 and therefore the steam supply conduits 56, 52 and 50, and simultaneously equalizing gas is supplied to the pipe 14 and therefore the supply conduit 58 and the annular space E, the pressure of the steam supplied being substantially equal to that of the equalizing gas.

Also simultaneously, air, as draining gas, is supplied to the pipe 16 and therefore the supply conduit 51, the pressure of the air supplied being substantially equal to that of the equalizing gas.

The steam distributed radially from the supply conduit 50, and the hydrogen produced by electrolysis of the steam, circulates in the annular groove 54 and is then recovered radially in the recovery conduit 59 and therefore by the recovery pipe 18.

The equalizing gas circulates in the annular space E and is recovered in the recovery conduit 58 and therefore by the recovery pipe 15.

The air distributed radially from the supply conduit 51, and the oxygen produced by electrolysis of the steam, circulates radially in the annular groove 57 and is then recovered by the recovery pipe 19.

While operation under pressure of an electrolysis reactor containing several stacked modules M1 proves satisfactory, the inventors observed that the implementation thereof may be complicated.

This is because the chains of dimensions of all the components of a module M1 are determined to guarantee compression of the metal seals 81, 82 at the periphery, as well as that of the electrical contact grids 9, 10. Typically, the compression produced by clamping is some tens of microns. The clamping force by compression is adjusted when the pressure rises inside the module M1.

However, being able to fulfill both functions (compression of the seals, compression of the electrical contact grids) simultaneously has proven tricky to carry out. During tests, the inventors were able to highlight the problems of leaks which appeared at the metal seals and also, contrary to this, when there is good leak tightness at these seals, the compression of the contact layers at the desired pressure was unsatisfactory.

There is therefore a need to find an improvement to the solution according to application WO2016/096752 while retaining the major advantage thereof, which is that of dispensing with the existing configurations of electrolyzer (HTE) of SOEC type or fuel cell of SOFC type, which require the use of a pressurized leak-tight chamber housing the HTE electrolyzer or the SOFC cell.

One aim of the invention is to at least partially meet this need.

SUMMARY OF THE INVENTION

To this end, the invention relates, in one alternative, to a module intended to form an individual unit of an electrolysis or co-electrolysis reactor of SOEC type, comprising:

- an individual electrochemical cell formed of a cathode, of an anode and of an electrolyte inserted between the cathode and the anode,
- a first and a second device each forming an electrical and fluid interconnector, each consisting of a component made of electron-conducting and gastight material, the first and second interconnectors being arranged on either side of the individual cell; the second interconnector being pierced with a conduit for recovering the hydrogen produced which opens out at the periphery of the cell on the cathode side; the second interconnector being pierced with a conduit for recovering the oxygen produced which opens out at the periphery of the cell on the anode side so as to carry out homogeneous distribution of the oxygen produced to the recovery conduit;
- a first electrically insulating seal arranged at the periphery of the individual cell and bearing both against the first interconnector and against the second interconnector;
- a second seal, arranged at the periphery of the anode of the individual cell and bearing both against the second interconnector and against the electrolyte; the second seal being based on glass and/or glass-ceramic;
- mechanical means for assembling the interconnectors with one another, suitable for clamping the first seal by compression;
- at least one electrical contact element arranged between one of the electrodes and one of the interconnectors;
- a compression piston comprising a component made of electron-conducting and gastight material, the piston being mounted so as to slide inside the first interconnector, the piston being suitable for compressing the electrical contact element(s); the compressive force of the piston being adjusted as the pressure of the steam and hydrogen produced within the module increases; the compression piston being pierced with a conduit for supplying steam, which opens out on the cell on the cathode side so as to carry out homogeneous distribution respectively of the steam supplied and the hydrogen produced from the supply conduit to the recovery conduit, and
- a sealing bellows, assembled by one end thereof to the piston and by the other end thereof to the first interconnector; the bellows being suitable both for containing the pressure of the steam and the hydrogen produced inside the module and for deforming along the direction of displacement of the piston.

According to a variant, the second interconnector is pierced with a conduit for supplying draining gas such as air, opening out on the cell on the anode side, so as to carry out homogeneous distribution respectively of the draining gas supplied and the oxygen produced from the supply conduit to the recovery conduit.

According to another alternative, the invention also relates to a module intended to form an individual unit of a fuel cell of SOFC type, comprising:

- an individual electrochemical cell formed of a cathode, of an anode and of an electrolyte inserted between the cathode and the anode,
- a first and a second device each forming an electrical and fluid interconnector, each consisting of a component made of electron-conducting and gastight material; the first and second interconnectors being arranged on either side of the individual cell; the second interconnector being pierced with a conduit for recovering the water produced, at the periphery of the cell on the anode side; the second interconnector being pierced with a conduit for supplying air or oxygen, which opens out on the cell on the cathode side, and with a conduit for recovering surplus air or oxygen, which opens out at the periphery of the cell on the cathode side so as to carry out homogeneous distribution of the air or oxygen from the supply conduit to the recovery conduit;
- a first electrically insulating seal arranged at the periphery of the individual cell and bearing both against the first interconnector and against the second interconnector;
- a second seal, arranged at the periphery of the cathode of the individual cell and bearing both against the second interconnector and against the electrolyte; the second seal being based on glass and/or glass-ceramic;
- mechanical means for assembling the interconnectors with one another, suitable for clamping the first seal by compression;
- at least one electrical contact element arranged between one of the electrodes and one of the interconnectors;
- a compression piston comprising a component made of electron-conducting and gastight material, the piston being mounted so as to slide inside the first interconnector, the piston being suitable for compressing the electrical contact element(s); the compressive force of the piston being adjusted as the pressure of the fuel and water produced within the module increases; the compression piston being pierced with a conduit for supplying fuel, which opens out on the cell on the anode side so as to carry out homogeneous distribution respectively of the fuel supplied and the water produced from the supply conduit to the recovery conduit, and
- a sealing bellows, assembled by one end thereof to the piston and by the other end thereof to the first interconnector; the bellows being suitable both for containing the pressure of the fuel and the water produced inside the module and for deforming along the direction of displacement of the piston.

In other words, the invention essentially consists in designing an individual module, within which the forces necessary to compress the seals are decoupled from those necessary for the electrical contact elements that ensure the passage of current in the module.

Thus, a module according to the invention incorporates a piston that slides inside one of the interconnectors, the compressive force of which, by gravity or by an actuator, which is adjustable during the rise in pressure within the module, will guarantee compression of the electrical contact element(s). The adjustment of the compressive force during the rise in pressure makes it possible to compensate for the background effect.

The bellows makes it possible to contain the pressure within the individual module and is suitable for deforming by following the displacement of the piston.

Independently of the operation of the piston and the bellows surrounding it, the first seal, preferably in the form of a ring made of mica, sandwiched between the two interconnectors of the same module, guarantees the pressure-tightness of the module by means for maintaining the assembly between interconnectors, preferably in the form of bolts.

A module according to the invention therefore dispenses with the following elements that are present in a module according to application WO2016/096752:
- a sealing and electrical insulation device, the function of which was to maintain the pressure inside the module;
- an equalizing gas circuit, the function of which was, during operation under pressure, on one side of the seals based on glass and/or on glass-ceramic, to equalize the pressure of the reagent gases generated on the other side;
- a device for inopportune opening of the module. Safe closure according to application WO2016/096752 is an added element with no link to the operation of the reactor. This safety thus forms an additional barrier in the event of the assembly exploding. Conversely, in the case of the present invention, the aim of the mechanical means for assembling the interconnectors with one another is to compress the first seal, in order to contain the pressure within the module.

Consequently, a module according to the invention is much simpler to produce than a module according to application WO2016/096752 and is also much simpler to implement due to not depending on a chain of dimensions in order to carry out both the compression of the seals and that of the electrical contact elements.

The mechanical means for assembling the interconnectors with one another advantageously consist of bolts.

The first seal may advantageously consist of a washer or ring made of mica.

According to an advantageous embodiment, the module comprises two electrical contact elements, preferably metal grids, one of which between one of the electrodes and one of the interconnectors, and the other of which between the other of the electrodes and the other of the interconnectors.

According to an advantageous variant embodiment, the first and/or second interconnector comprise(s) a first groove formed between the first seal and the cell (C1), the supply conduit of the first interconnector being in communication with the first groove so as to carry out homogeneous distribution of the steam supplied and the hydrogen produced or of the fuel supplied and the water produced, to the recovery conduit of the first interconnector.

According to another advantageous variant embodiment, the second interconnector comprises a second groove formed inside a zone delimited by the second seal, the supply conduit of the second interconnector being in communication with the second groove so as to carry out homogeneous distribution of the oxygen produced or the air supplied, to the recovery conduit of the second interconnector.

Preferably:
- the first and second interconnectors are each pierced with an additional conduit for supplying steam or fuel; the two additional supply conduits being connected to one another via an electrically insulating connection tube; the additional supply conduit of the first interconnector being connected to the supply conduit pierced in the piston by a pipe outside the module;
- the first seal has, within it, a third seal, inside which the connection tube is accommodated.

According to one advantageous embodiment, the individual electrochemical cell, the first and second interconnectors, the first and second seals, the piston and the bellows are of axisymmetrical form about a central axis (X), the conduits for supplying reagent gases (steam or fuel) and (draining gases, such as air or air or oxygen) opening out along the central axis.

The metal component of the first and/or the second interconnector and/or the piston are preferably made of ferritic steel containing approximately 20% chromium, preferably made of CROFER® 22APU or F18TNb, or based on nickel of Inconel® 600 or Haynes® 230® type.

More preferably still, the bellows is made of ferritic steel containing approximately 20% chromium, preferably based on Inconel® 625 or Haynes® 230®.

The invention also relates to a process for operating an HTE co-electrolysis or electrolysis module which has just been described, according to which:
- the supply conduits of the piston are supplied with steam or with a mixture of steam and another gas chosen from carbon dioxide and nitrogen dioxide;
- as the pressure rises within the reactor, the compressive force applied by the piston to the electrical contact element(s) is adjusted;
- the hydrogen or the hydrogen and the nitrogen or carbon monoxide produced by steam electrolysis or co-electrolysis are recovered.

According to an advantageous embodiment, the supply conduits of the second interconnector are supplied with draining gas such as air, the pressure of the draining gas supplied being substantially equal to that of the steam or of the mixture of steam and the other gas, and the oxygen produced is recovered.

The invention finally relates to a process for operating an SOFC fuel cell module described above, according to which:
- the supply conduits of the piston are supplied with fuel, such as hydrogen or methane;
- the supply conduits of the second interconnector are supplied with air or oxygen, the pressure of the fuel and of the air or oxygen supplied being substantially equal to that of the hydrogen or methane;
- as the pressure rises within the cell, the compressive force applied by the piston to the electrical contact element(s) is adjusted;

the surplus fuel, the water produced on one side and the surplus air or oxygen on the other side are recovered in their respective recovery conduit.

DETAILED DESCRIPTION

Figure 8:
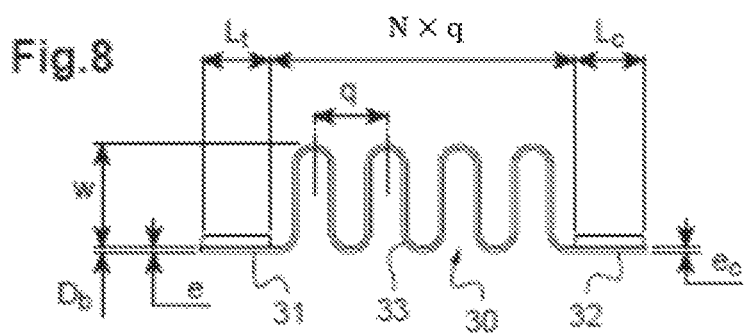

Other advantages and features of the invention will become more clearly apparent on reading the detailed description of examples of implementation of the invention, given by way of non-limiting illustration with reference to the following figures, in which:

FIG. 1 is a schematic view showing the operating principle of a high-temperature water electrolyzer, FIG. 2 is a schematic exploded view of a part of a high-temperature steam electrolyzer (HTE) of SOEC type comprising interconnectors according to the state of the art, FIG. 3 is an exploded view of an embodiment of a module according to patent application WO2016/096752 for an HTE reactor, FIG. 4 is a sectional view of a module assembled according to FIG. 3, the section being made respectively in the plane of circulation of the equalizing gas, FIGS. 5 et 6 are sectional views of a module assembled according to FIG. 3, the section being made respectively in the plane of circulation of the steam supplied and of the hydrogen produced, and in the plane of circulation of the air supplied and the oxygen produced, FIG. 7 is an exploded three-quarters sectional view of an embodiment of a module according to the invention for stacked HTE electrolysis reactor, FIG. 8 is a sectional view of a sealing bellows used in a module according to the invention, FIG. 9 is a sectional view of a module according to the invention, assembled according to FIG. 7, the section being made in the plane of circulation of the steam supplied and of the hydrogen produced, FIG. 10 is a sectional view of a module according to the invention, assembled according to FIG. 7, the section being made in the plane of circulation of the air supplied and of the oxygen produced, FIG. 11 is a perspective view of a module according to the invention, assembled according to FIG. 7, showing locally the passage of the steam supply between the two interconnectors.

FIGS. 1 to 6, which relate to the prior art, have already been commented on in the preamble. They are therefore not described below.

For the sake of clarity, the same elements of an HTE electrolysis reactor module M1 according to patent application WO2016/096752 and of an HTE electrolysis reactor module M1 according to the invention are designated by the same numerical references.

It will be noted here that throughout the present patent application, the terms "lower", "upper", "above", "below", "inside", "outside", "internal" and "external" are to be understood with reference to an interconnector according to the invention seen in transverse cross section along the axis of symmetry X.

It will also be noted that the electrolyzer or fuel-cell modules described are solid-oxide electrolysis cell (SOEC) electrolyzer modules or solid-oxide fuel cell (SOFC) modules that operate at high temperature.

Thus, all the constituents (anode/electrolyte/cathode) of an electrolysis cell or fuel cell are ceramics.

The high operating temperature of an electrolyzer (electrolysis reactor) or of a cell is typically between 600° C. and 1000° C.

Typically, the characteristics of an individual SOEC electrolysis cell suitable for the invention, of the cathode-supported type (CSC), may be those indicated as follows in table 1 below.

TABLE 1

| Electrolysis cell | Unit | Value |
|---|---|---|
| Cathode 2 | | |
| Material from which it is made | | Ni-YSZ |
| Thickness | µm | 315 |
| Thermal conductivity | W m$^{-1}$ K$^{-1}$ | 13.1 |
| Electrical conductivity | Ω$^{-1}$ m$^{-1}$ | 10$^5$ |
| Porosity | | 0.37 |
| Permeability | m$^2$ | 10$^{-13}$ |
| Tortuosity | | 4 |
| Current density | A · m$^{-2}$ | 5300 |
| Anode 4 | | |
| Material from which it is made | | LSM |
| Thickness | µm | 20 |
| Thermal conductivity | W m$^{-1}$ K$^{-1}$ | 9.6 |
| Electrical conductivity | Ω$^{-1}$ m$^{-1}$ | 1 × 10$^4$ |
| Porosity | | 0.37 |
| Permeability | m$^2$ | 10$^{-13}$ |
| Tortuosity | | 4 |
| Current density | A · m$^{-2}$ | 2000 |
| Electrolyte 3 | | |
| Material from which it is made | | YSZ |
| Thickness | µm | |
| Resistivity | Ω m | 0.42 |

FIG. 7 shows a schematic sectional view of a module M1 intended to form the individual unit of an HTE steam electrolyzer in accordance with the invention.

All the elements common to the module M1 of patent application WO2016/096752 and that of the invention will not be described here, which elements can be seen perfectly clearly on all FIGS. 1 to 11.

The module M1 comprises a compression piston 20 mounted so as to slide inside the upper interconnector 5.1. This piston is pierced with the central conduit 50 for supplying steam on the cell C1.

The force of gravity, or an actuator, not shown, may apply a vertical compressive force downwards on the piston 20. This compressive force will be adjusted as the pressure rises within the module, in order to compensate the background effect due to pressure. Indeed, the operating pressure will generate a loosening force with a value F that is equal to the pressure multiplied by the surface area of the disk to which the pressure is applied. Thus, this loosening force must be compensated by the compensation value, otherwise the piston 20 will not correctly compress the contact grids 9, 10.

The upper interconnector 5.1 and the lower interconnector 5.2 are each pierced with a lateral conduit for supplying steam 52, 56. These two lateral supply conduits are connected to one another via an electrically insulating connection tube T.

A pipe 60 arranged outside the module connects the lateral supply conduit 52 of the upper interconnector to the central supply conduit 50 of the piston (FIG. 9).

When the pressure of the module M1 rises, the piston 20, the force of which is provided by the weight of gravity or an actuator. The pins 40 make it possible to center the cell in order for the piston to compress the electrical contact grids 9, 10 on either side of the cell C1 (FIG. 10).

A bellows 30 made of Inconel® 625 or made of Haynes® 230 is assembled by its upper end 31 to the piston 20 and by its lower end 32 to the upper interconnector 5.1. As can be seen in FIG. 9, each end 31, 32 of the spring 30 may be inserted into a peripheral groove 21, 22, respectively of the piston 20 and of the interconnector 5.1. The ends 31, 32 are preferably assembled to each of the two metal components 20, 5.1, by welding, especially by TIG welding. Any other assembly means may be suitable.

The bellows 30 will make it possible to contain the pressure inside the individual module but also to vertically deform under the compressive force applied by and to the piston 20.

It is ensured that the bellows 30 is firstly dimensioned to withstand the nominal operation pressure and temperature within the module. Another restriction of the compensation spring is that of having sufficiently low stiffness to be able to take on the expansions and not require too much force on the piston.

The inventors have found that a bellows 30 with a linear stiffness of less than 300 N/mm was satisfactory.

The inventors designed a bellows 30 as shown in FIG. 8, comprising two ends each in the form of a sleeve with belt 31 and 32 and a central portion 33 in the form of regular waves. The two ends 31, 32 therefore have a belt which makes it possible to weld the bellows 30 respectively to the piston 20 and to the upper interconnector 5.1.

The dimensioning was produced by assuming a reduced number of thermal cycles of a module M1 with a nominal pressure fixed at 10 bar and a nominal operating temperature of 800° C.

By way of indication, the dimensional characteristics of a bellows 30 made of Inconel® 625 are indicated in table 2 below.

TABLE 2

| | |
|---|---|
| n number of layers | 2 |
| N number of waves | 6 |
| E Young's modulus | 150 000 MPa |
| v Poisson's modulus | 0.3 |
| Dm mean diameter of the waves 33 | 61.8 mm |
| Db interior diameter | 54 mm |
| e initial thickness of sheet for bellows | 0.4 mm |
| w height of waves | 7 mm |
| q distance between two consecutive waves | 9 mm |
| Lc length of sleeve 32 | 14 mm |
| Ec thickness of sleeve 32 | 3.6 mm |
| Lt length of sleeve 31 | 15 mm |

A washer or ring made of mica 61 is sandwiched between the interconnector 5.1 and the interconnector 5.2 and compressed via screws/clamping nuts or bolts 11, in order to guarantee the pressure-tightness of the module M1 (FIGS. 7 and 9). The bolts 11 thus make it possible both to assemble the interconnectors 5.1, 5.2 and to compress the washer made of mica 61.

As can be seen in FIG. 9, in the clamped state, the washers 112 of the screw-clamping nut systems 11 bear against the upper surface of the upper interconnector 5.1. Typically, a bolting force of 2 N/m is applied.

A screw-clamping nut system 11 is preferably produced from the same material as that of the interconnectors 5.1, 5.2 and piston 20. The washers 112 and rings 12 around each screw 110 are electrically insulating in order to guarantee electrical insulation between the two interconnectors.

As can be seen in FIG. 11, the mica ring 61 is pierced with a through-hole for the connection tube T for the steam originating from the conduit 56 of the lower interconnector 5.2. Around this through-hole, an additional glass-ceramic seal 64 is produced in order to guarantee the leak tightness of the passage of the steam, which thus makes it possible to ensure pressure-tightness of the module and insulates the tube T. The tube T is also electrically insulating, typically made of ceramic.

The operation of an HTE electrolysis reactor comprising several modules according to the invention which have just been described, the modules being stacked on one another, like that shown in FIGS. 7 to 11, will now be described.

Pressurized steam is supplied to the pipe 17 and therefore the steam supply conduits 56, 52 and 50.

Simultaneously, air, as draining gas, is supplied to the pipe 16 and therefore the supply conduit 51, the pressure of the air supplied being substantially equal to that of the steam.

As the pressure rises, the pressure of the piston 20 on the electrical contact layers is adjusted.

The steam is distributed radially, respectively by the groove 56, the connection pipe T, the groove 52, then the pipe 60 then arrives in the central supply conduit 50 (FIG. 9).

The hydrogen produced by electrolysis of the steam, circulates in the annular groove 54 and is then recovered radially in the recovery conduit 59 and therefore by the recovery pipe 18.

The air distributed radially from the supply conduit 51, and the oxygen produced by electrolysis of the steam, circulates radially in the annular groove 57 and is then recovered by the recovery pipe 19.

The electrical insulation between the interconnector 5.2 on the one hand and the assembly formed by the interconnector 5.1 and the piston 20 are electrically insulated by the mica washer 61, the rings 12, the washers 112 and the tube T which are all made of electrically insulating material, preferably made of ceramic.

Therefore, the interconnector 5.2 with its peripherals, i.e. its gas supply tubes, is earthed and has no electrical connection with the interconnector 5.1 and its peripherals, i.e. the piston 20, the bellows 30 and the pipe 60.

Other variants and advantages of the invention may be applied without departing from the scope of the invention.

For example, it is possible to pierce one or the other of the two interconnectors of a module in order to pass instruments, such as a thermocouple, therethrough.

Although it has been described for high-temperature electrolysis of water, the module M1 according to the invention may just as well be used for co-electrolysis of steam, mixed either with carbon dioxide or nitrogen dioxide.

Although it has been described for high-temperature electrolysis of water, the module M1 according to the invention may just as well be used as SOFC fuel cell. In this case, the supply pipes 17 are supplied with fuel, for example hydrogen or methane, and the pipes 16 are supplied with air or oxygen.

The invention is not limited to the above-described examples; features of the illustrated examples may especially be combined in variants that have not been illustrated.

The invention claimed is:

1. A module, intended to form an individual unit of an electrolysis or co-electrolysis reactor of SOEC type, comprising:
   an individual electrochemical cell (C1) formed of a cathode, or an anode and of an electrolyte inserted between the cathode and the anode, a first and a second device each forming an electrical and fluid tight interconnector, each consisting of a component made of electron-conducting and gastight material, the first and second interconnectors being arranged on either side of the individual cell; the second interconnector being pierced with a conduit for recovering hydrogen produced, which opens out at a periphery of the cell on a cathode side; the second interconnector being pierced with a conduit for recovering oxygen produced, which opens out at a periphery of the cell on an anode side so as to carry out homogenous distribution of the oxygen produced to a first recovery conduit;

a first electrically insulating seal arranged at the periphery of the individual cell and bearing both against the first interconnector and against the second interconnector;

a second seal, arranged at the periphery of the anode of the individual cell and bearing both against the second interconnector and against the electrolyte; the second seal being based on glass and/or glass-ceramic;

mechanical means for assembling the interconnectors with one another, suitable for clamping the first seal by compression;

at least one electrical contact element arranged between the cathode or the anode and one of the interconnectors;

a compression piston comprising a component made of electron-conducting and gastight material, the piston being mounted so as to slide inside the first interconnector, the piston being suitable for compressing the electrical contact element(s); the compressive force of the piston being adjusted as the pressure of steam and hydrogen produced within the module increases; the compression piston being pierced with a conduit for supplying steam, which opens out on the cell on the cathode side so as to carry out homogenous distribution respectively of the steam supplied and the hydrogen produced from the steam supply conduit to a second recovery conduit, and a sealing bellows, assembled by on end thereof to the piston and by another end thereof to the first interconnector; the bellows being suitable both for containing the pressure of the steam and the hydrogen produced inside the module and for deforming along the direction of displacement of the piston.

2. The module according to claim 1, wherein the second interconnector is pierced with a conduit for supplying draining gas, on the cell on the anode side, so as to carry out homogenous distribution respectively of the draining gas supplied and the oxygen produced from the draining gas supply conduit to the first recovery conduit.

3. The module according to claim 1, wherein the first seal consists of a washer or ring made of mica.

4. The module according to claim 1, wherein the at least one electrical contact element comprises a first electrical contact element and a second electrical contact element, the first electrical contact element being arranged between the cathode and one of the interconnectors, and the second electrical contact element being arranged between the anode and the other of the interconnectors.

5. The module according to claim 1, the second interconnector comprising a second groove formed inside a zone delimited by the second seal, a conduit for supplying draining gas being in communication with the second groove so as to carry out homogenous distribution of the oxygen produced or the draining gas supplied, to the oxygen recovery conduit of the second interconnector.

6. The module according to claim 1, wherein the individual electrochemical cell (C1), the first and second interconnectors, the first and second seals, the piston and the bellows are of axisymmetrical form about a central axis (X), the steam supply conduit and/or a conduit for supplying draining gas opening out along the central axis (X).

7. The module according to claim 1, wherein a metal component of the first and/or the second interconnector and/or the piston are made of ferritic steel containing approximately 20% chromium.

8. The module according to claim 1, wherein the bellows are made of ferritic steel containing approximately 20% chromium.

9. The module according to claim 1, the first and/or second interconnector comprising a first groove formed between the first seal and the cell (C1), the steam supply conduit being in communication with the first groove so as to carry out homogenous distribution of the steam supplied and produced hydrogen to the second recovery conduit.

10. The module according to claim 1, wherein:
the first and second interconnectors are each pierced with an additional conduit for supplying steam; the two additional supply conduits being connected to one another via an electrically insulating connection tube; the additional supply conduit of the first interconnector being connected to the supply conduit pierced in the piston by a pipe outside the module;
the first seal has, within it, a third seal, inside which the connection tube is accommodated.

11. A process for operating an electrolysis or co-electrolysis module (M1) according to claim 1, according to which:
the supply conduits of the piston is supplied with steam or with a mixture of stream and another gas chosen from carbon dioxide and nitrogen dioxide;
as the pressure rises within the module, the compressive force applied by the piston to the electrical contact element(s) is adjusted;
the hydrogen or the hydrogen and nitrogen or carbon monoxide produced by steam electrolysis or co-electrolysis are recovered.

12. The operating process according to claim 11, according to which a supply conduit of the second interconnector is supplied with draining gas, the pressure of the draining gas supplied being substantially equal to that of the steam or of the mixture of steam and the other gas, and the oxygen produced is recovered.

13. A module, intended to form an individual unit of a fuel cell of SOFC type, comprising:
an individual electrochemical cell (C1) formed of a cathode, or an anode and of an electrolyte inserted between the cathode and the anode,
a first and a second device each forming an electrical and fluid tight interconnector, each consisting of a component made of electron-conducting and gastight material; the first and second interconnectors being arranged on either side of the individual cell; the second interconnector being pierced with a conduit for recovering water produced, at a periphery of the cell on an anode side; the second interconnector being pierced with a conduit for supplying air or oxygen, which opens out at a periphery of the cell on a cathode side, and with a conduit for recovering surplus air or oxygen, which opens out at a periphery of the cell on the cathode side so as to carry out homogenous distribution of the air or oxygen from the air or oxygen supply conduit to a second air or oxygen recovery conduit;
a first electrically insulating seal arranged at the periphery of the individual cell and bearing both against the first interconnector and against the second interconnector;

a second seal, arranged at the periphery of the anode of the individual cell and bearing both against the second interconnector and against the electrolyte; the second seal being based on glass and/or glass-ceramic;

mechanical means for assembling the interconnectors with one another, suitable for clamping the first seal by compression;

at least one electrical contact element arranged between the cathode or the anode and one of the interconnectors;

a compression piston comprising a component made of electron-conducting and gastight material, the piston being mounted so as to slide inside the first interconnector, the piston being suitable for compressing the electrical contact element(s); the compressive force of the piston being adjusted as the pressure of fuel and water produced within the module increases; the compression piston being pierced with a conduit for supplying fuel, which opens out on the cell on the anode side so as to carry out homogenous distribution respectively of the fuel supplied and the water produced from the fuel supply conduit to the water recovery conduit, and a sealing bellows, assembled by on end thereof to the piston and by another end thereof to the first interconnector; the bellows being suitable both for containing the pressure of the steam and the hydrogen produced inside the module and for deforming along the direction of displacement of the piston.

14. The module according to claim 13, the first and/or second interconnector comprising a first groove formed between the first seal and the cell (C1), the fuel supply conduit being in communication with the first groove so as to carry out homogeneous distribution of the fuel supplied and the water produced to the water recovery conduit.

15. The module according to claim 13, wherein:

the first and second interconnectors are each pierced with an additional conduit for supplying fuel; the two additional supply conduits being connected to one another via an electrically insulating connection tube; the additional supply conduit of the first interconnector being connected to the supply conduit pierced in the piston by a pipe outside the module;

the first seal has, within it, a third seal, inside which the connection tube is accommodated.

16. A process for operating an SOFC fuel cell module (M1) according to claim 13, according to which:

the supply conduits of the piston is supplied with fuel, such as hydrogen or methane;

the air or oxygen supply conduit of the second interconnector is supplied with air or oxygen, the pressure of the fuel and of the air or oxygen supplied being substantially equal to that of the hydrogen or methane;

as the pressure rises within the cell, the compressive force applied by the piston to the electrical contact element(s) is adjusted;

the surplus fuel, the water produced, and the surplus air or oxygen are recovered.

* * * * *